Figure 1:
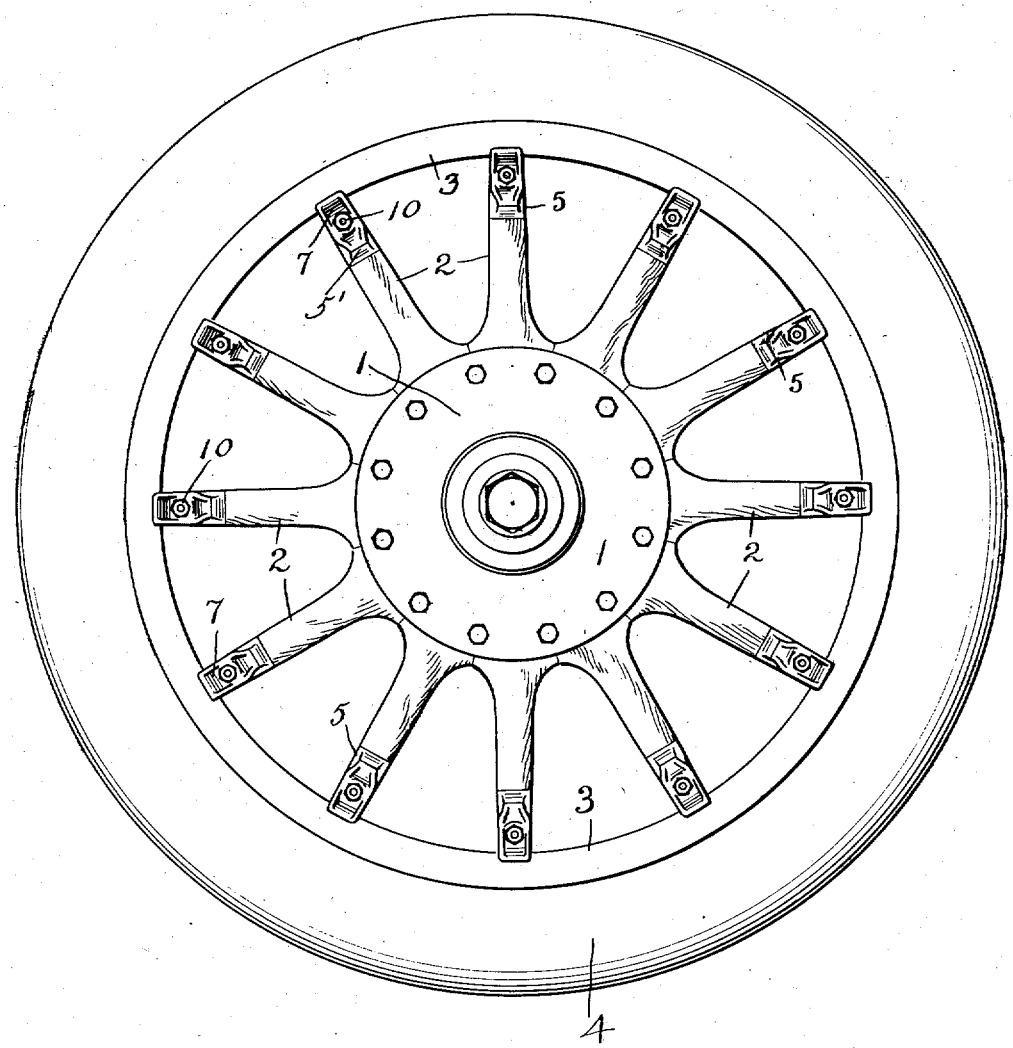

H. C. GIBSON.
VEHICLE WHEEL.
APPLICATION FILED JAN. 9, 1908.

986,452.

Patented Mar. 14, 1911.

2 SHEETS—SHEET 1.

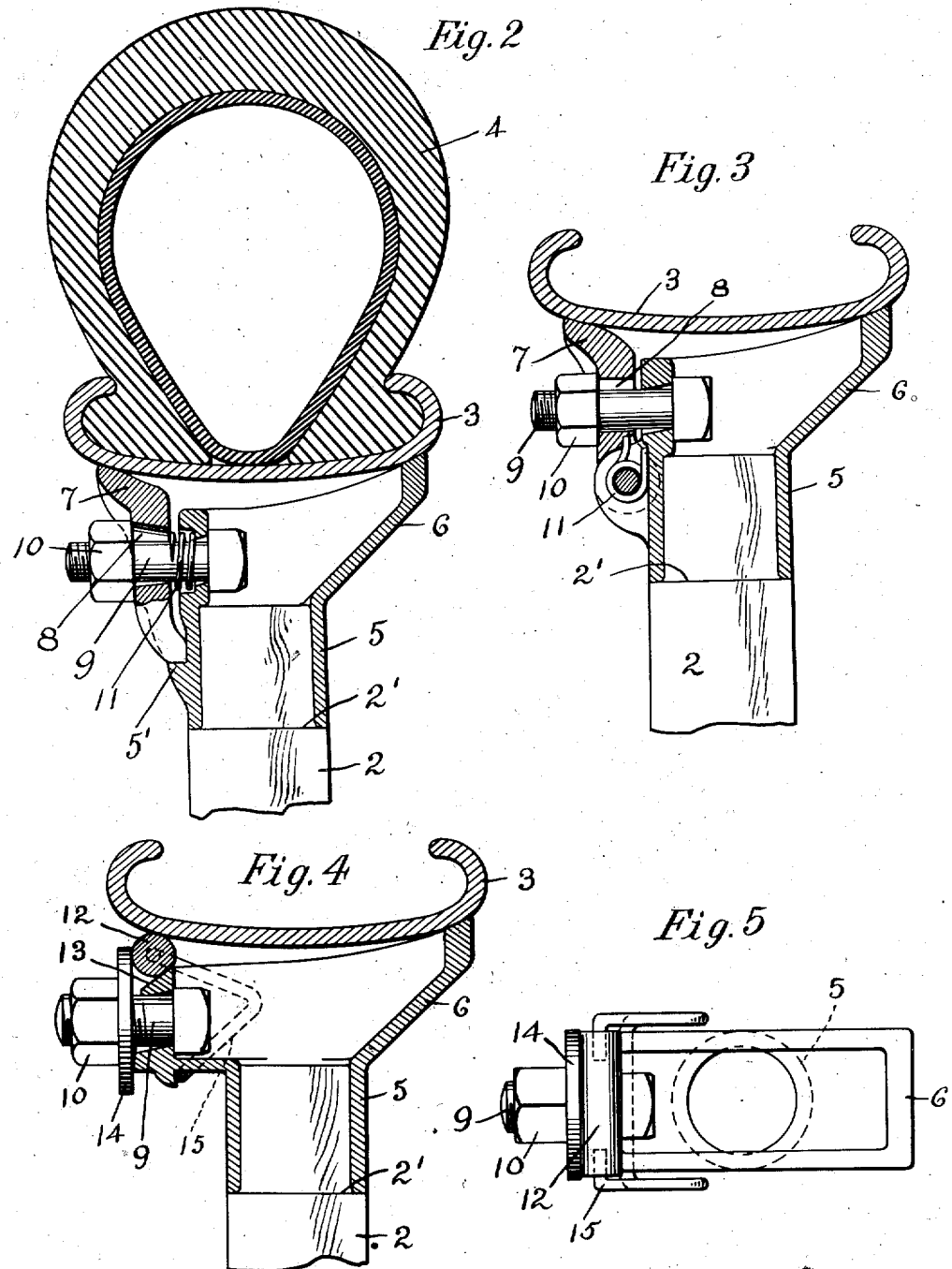

UNITED STATES PATENT OFFICE.

HUGO CECIL GIBSON, OF NEW YORK, N. Y.

VEHICLE-WHEEL.

986,452.        Specification of Letters Patent.      Patented Mar. 14, 1911.

Application filed January 9, 1908. Serial No. 410,055.

*To all whom it may concern:*

Be it known that I, HUGO C. GIBSON, a subject of the King of Great Britain, and a resident of New York, in the county of New York and State of New York, have invented certain new and useful Improvements in Vehicle-Wheels, of which the following is a specification.

My invention relates to vehicle wheels such as used on automobiles and the like wherein a pneumatic tire is used and relates more particularly to that class of wheels in which a metallic rim carrying a pneumatic tire is dismountably secured to the spokes of the wheel.

One of the objects of my invention is to provide a construction whereby a tire-holding rim may be demountably secured to a wheel and effectually held thereto by friction in such a manner that the clamping devices will not become wedged or jammed in place and yet will securely grip and hold the rim.

An object of my invention in one of its forms is to dispense with the felly ordinarily used in vehicle wheels of this class and to provide a wheel with a dismountable rim which will not have to be angularly located when placing it upon the wheel and which will be capable of self-alinement.

Another object of my invention is to provide each spoke of the wheel with an individual clamp which will rigidly hold the rim in place by friction and thus dispense with the provision of special devices secured to the rim by which it is attached to the wheel.

A further object is to provide an apparatus wherein the rim can be very readily and quickly removed from and replaced upon the wheel and at the same time one which will be very simple in construction and of low cost to manufacture.

A still further object is to provide a wheel with a dismountable rim which can be taken from the wheel without entirely removing the clamping means therefrom.

To these ends my invention consists broadly in providing a vehicle wheel with fixed means adapted to engage the rim on one side and movable clamping levers fulcrumed or seated on projections on the wheel for engaging the rim on the other side. Preferably, the felly of the wheel permanently attached in the ordinary way is dispensed with.

My invention also consists in the improved individual clamps secured to the ends of the spokes for frictionally engaging the wheel rim as hereinafter specified in the claims.

My invention consists further in so constructing the device that the weight and shock to which the rim is subjected will be transmitted to the spokes and hub of the wheel instead of acting direct on the nuts and bolts which hold the rim in place as is the case in the devices of this class at present on the market.

My invention consists further in the details of construction and combinations of parts hereinafter more particularly described and then specified in the claims.

In the accompanying drawings, Figure 1 illustrates in side elevation a wheel constructed according to my invention. Fig. 2 is an enlarged vertical central section through the tire, rim and preferred form of clamping device, the spoke being shown in side elevation. Fig. 3 illustrates a vertical central section through a modified form. Fig. 4 is a similar view of a further modification. Fig. 5 is a plan view of the modified clamping device shown in Fig. 4.

1 indicates the hub of a wheel provided with spokes 2 extending radially therefrom as is usual in the art.

According to my invention in its preferred form the usual permanently attached felly is not employed, but the spokes 2 are each provided at their end with a clamping device which engages the rim 3 by clamping on the periphery of the rim as will be presently described. The rim 3 is here shown as being the usual standard clencher type rim, provided with the usual tire 4, but obviously might be any other form of rim suitable to be engaged and held by friction by the arms of the clamping devices.

In the preferred form of carrying out my invention, the ends of the spokes 2 are of smaller diameter than the main portion and are provided with a shoulder 2'. Over the small end is snugly fitted a hollow metal casting or forging forming a socket 5, the lower end of which rests upon the shoulder 2'.

The upper part of the socket 5 is provided with an outwardly and upwardly extending arm 6, preferably integral therewith, which engages one side of the rim 3 on its curved surface, that is, where the rim curves outwardly to form the usual clencher for the tire 4, or it might engage a similar or angularly disposed surface of other suitable forms of rim.

Referring more particularly to Fig. 2, a movable clamping member consisting preferably of an arm or lever 7 engages the other side of the rim 3 on its curved surface. The movable lever 7 is fulcrumed on a lug or shoulder 5' projecting from the side of the socket 5 and provided with a centrally located slot 8. A bolt 9 having its head located within the hollow casting forming the socket 5 passes through a suitable opening in the side of the casting and through the slot 8 after which it is provided with a suitable nut 10 by which the movable clamp is drawn up to the socket and tightened upon the rim. The lower end of the arm 7 having a solid bearing on the projection or shoulder 5' a great pressure is exerted upon the rim to grip and clamp it between the arms 6 and 7 when the arm 7 is forced up by the nut 10. Preferably a coiled spring 11 compressed between the socket 5 and the arm 7 forces the said arm away from the rim when the clamping nut 10 is loosened.

The rim being in its preferred form entirely smooth on its inner periphery can be placed on the wheel without any regard to its angular position and will be brought into proper alinement by the tightening up of the clamps, the rim being extended to its furthermost position at the same time and rigidly held in place by the friction between it and the arms 6 and 7. As will be obvious all that is necessary to do in order to remove the rim from the wheel is to loosen the nuts 10 and the arms 7 will be forced away from the rim by the springs 11, the arm turning about its seat on the lug 5' as a pivot after which the rim is readily removed and a new one substituted. Also as will be obvious all the weight and shock on the rim whether transmitted to the fixed or movable clamping arm will be brought to bear direct upon the spokes and hub of the wheel, the movable arm transmitting the shock to the projection on which it is seated or fulcrumed.

In the modification illustrated in Fig. 3 the movable clamp 7 is hinged or pivoted to the casting forming socket 5, the spring 11 being preferably wound around the pivot and held under tension between the arm 7 and the socket 5 as shown.

Referring to the modification shown in Figs. 4 and 5, the movable clamping member consists of a roller 12 riding upon an inclined surface 13 formed on the casting 5 and drawn up into engagement with the periphery of the rim to clamp the same by the nut 10 and washer 14. A spring 15 secured to the ends of the roller 12 serves to positively draw the roller away from the rim when released and also prevents the roller falling from the device when loosened.

While I have shown and prefer to use a spring to positively force the movable clamping member from the rim, it will be obvious that I do not limit myself to the use of this spring as my invention is equally practicable without utilizing any spring.

While I have here shown and described a rim of the standard clencher type, it is obvious that my invention is not limited to the same as other suitable forms of rim might be employed presenting a similar surface to be frictionally engaged by the arms of the clamping devices without departing from the spirit of my invention. Also it would be within the scope of my invention to make both arms of the individual clamping devices movable.

It will also be noted that by practicing my invention spreaders or clamping lugs for the tire of the usual construction as used with fixed rims can be employed, whereas in the forms of detachable rims for pneumatic tires as previously constructed it is necessary to use specially constructed lugs for the purpose, mainly on account of the felly of the wheel being retained. If it is desired to use long lugs of the usual construction with the old forms of detachable rim the felly would have to be cut away to allow for the lug which practice is very objectionable as can readily be seen.

What I claim as my invention is:

1. In a vehicle wheel, the combination with a rim adapted to hold a pneumatic tire, of a fixed arm secured to the wheel and adapted to engage the rim on one side, a movable clamping lever fulcrumed at a fixed point on the wheel and adapted to engage the rim opposite the fixed arm and clamping means passing loosely through said lever between its fulcrum and the free end and adapted to turn said lever about its fulcrum and force the free end of said lever against said rim.

2. In a vehicle wheel, the combination with the spokes, of a rim adapted to hold a pneumatic tire, an individual socket secured to each spoke and provided with a projecting arm adapted to engage said rim at one side, a movable clamping lever secured to said socket and adapted to engage said rim opposite said fixed arm and clamping means adapted to force said lever toward said arm to grip the rim between said arm and said lever.

3. In a vehicle wheel, the combination with the spokes, of a rim adapted to hold a pneumatic tire, an individual socket secured to each spoke and provided with an arm adapted to engage the periphery of the rim at one side, a laterally projecting shoulder on the periphery of said socket, a movable clamp fulcrumed on said shoulder and means adapted to force the free end of said clamp against the periphery of said rim opposite said arm.

4. In a vehicle wheel, the combination with the hub and the spokes, of a rim adapted to hold a pneumatic tire, an individual socket secured to the end of each spoke provided with a fixed arm adapted to engage a curved surface of the rim, a movable lever fulcrumed at a fixed point on said socket and adapted to engage the curved surface of the rim opposite the fixed arm, and means for clamping said movable arm.

5. In a vehicle wheel, the combination with the hub and the spokes, of a rim adapted to hold a pneumatic tire, an individual socket secured to the end of each spoke provided with a fixed arm adapted to engage a curved surface of the rim, a movable arm adapted to engage the curved surface of the rim opposite the fixed arm, means for clamping said movable arm and means adapted to force said movable arm out of engagement with said rim.

6. In a vehicle wheel, the combination with the hub and the spokes, of a rim adapted to hold a pneumatic tire, an individual socket secured to the end of each spoke provided with a fixed arm adapted to engage a curved surface of the rim, a movable arm adapted to engage the curved surface of the rim opposite the fixed arm, means for clamping said movable arm and a spring operating on said movable arm to force the same away from said rim.

7. In a vehicle wheel, the combination with the spokes, of a rim adapted to hold a pneumatic tire, an individual socket secured to each spoke provided with an arm adapted to engage an inclined surface of the rim at one side, a laterally movable clamping lever fulcrumed on said socket and adapted to engage an inclined surface of the rim at the opposite side and clamping means for said lever.

8. In a vehicle wheel, the combination with the hub and spokes, of a rim adapted to hold a pneumatic tire, an individual socket secured to the end of each spoke provided with a fixed arm adapted to engage an inclined surface of the rim, a slotted movable lever fulcrumed on said socket and adapted to engage an inclined surface of the rim opposite the fixed arm, and means for clamping said movable arm to said socket through said slot.

9. In a vehicle wheel, the combination with the spokes, of a rim adapted to hold a pneumatic tire, an individual socket secured to each spoke and provided with an arm adapted to engage said rim, a slotted lever fulcrumed at a fixed point on said socket and adapted to engage said rim opposite said arm and means for clamping said lever to said socket through said slot.

10. In a vehicle wheel, the combination with the hub and the spokes, of a rim adapted to hold a pneumatic tire, an individual socket seated on the end of each spoke provided with a fixed arm and a movable clamping lever loosely fulcrumed on said socket and means adapted to clamp said rim between said clamping lever and said fixed arm.

11. A clamp for frictionally engaging a wheel rim comprising a body portion provided with a socket adapted to be fitted on the end of a spoke, a fixed clamping member secured to said body portion, a projection on the side of said body portion and a movable clamping member opposite said fixed member and seated on said projection.

12. A clamp for frictionally engaging a wheel rim comprising a body portion provided with a socket adapted to be fitted on the end of a spoke, a fixed clamping member secured to said body portion, a laterally movable clamping member having one end fulcrumed at a fixed point on said body portion and means adapted to force the free end of said movable member toward said fixed member.

Signed at New York in the county of New York and State of New York this 14th day of December A. D. 1907.

HUGO CECIL GIBSON.

Witnesses:
RAYMOND HEALY,
DAVID HAYS.